United States Patent [19]

Phillips et al.

[11] Patent Number: 4,866,917

[45] Date of Patent: Sep. 19, 1989

[54] OFFSET REEL ARRANGEMENT FOR TRIPLEX GREENS MOWER

[75] Inventors: David L. Phillips; Larry N. Smith, both of Ottumwa, Iowa

[73] Assignee: Deere & Company, Moline, Ill.

[21] Appl. No.: 145,344

[22] Filed: Jan. 19, 1988

[51] Int. Cl.[4] .......... A01D 75/30

[52] U.S. Cl. .......... 56/7; 56/6

[58] Field of Search .......... 56/6, 7

[56] References Cited

U.S. PATENT DOCUMENTS

| | | | |
|---|---|---|---|
| 2,178,467 | 10/1939 | Brent | 280/412 |
| 2,515,662 | 7/1950 | Norton | 56/7 |
| 2,764,864 | 10/1956 | Kinhead | 56/7 |
| 3,090,184 | 5/1963 | Hadek | 56/7 |
| 3,757,500 | 9/1973 | Averitt | 56/6 |
| 3,832,834 | 9/1974 | Kovacs | 56/6 |
| 3,893,283 | 7/1975 | Dandl | 56/6 |
| 3,910,016 | 10/1975 | Salla et al. | 56/7 |
| 3,965,658 | 6/1976 | van der Lely | 56/6 |
| 3,968,630 | 7/1976 | Mitchell | 56/7 |
| 4,637,625 | 1/1967 | Blackwell | 56/7 |

FOREIGN PATENT DOCUMENTS

| | | |
|---|---|---|
| 0189619 | of 0000 | European Pat. Off. . |
| 2652743 | of 0000 | Fed. Rep. of Germany . |
| 3344049 | of 0000 | Fed. Rep. of Germany . |
| 761572 | of 0000 | United Kingdom . |
| 1074691 | of 0000 | United Kingdom . |
| WO87/06792 | of 0000 | World Int. Prop. O. . |

*Primary Examiner*—Paul J. Hirsch

[57] ABSTRACT

A self-propelled, triplex greens mower has two front wheels and a single wheel mounted symmetrically relative to a longitudinal center line of the mower. Three mower units are mounted to the mower frame to cut grass ahead of each of the wheels. These mower units are offset so as to be located non-symmetrically relative to the center line with the offset being a distance equal to at least one-half the width of the wheels. Because of this offset, it is necessary only to reverse the mower direction for performing consecutive perimeter and cross cutting operations on a green in order to have the wheels follow different paths, thus avoiding undue compaction.

3 Claims, 2 Drawing Sheets

OFFSET REEL ARRANGEMENT FOR TRIPLEX GREENS MOWER

BACKGROUND OF THE INVENTION

The present invention relates to reel-type grass mowers and more specifically relates to self-propelled, triplex or three reel mowers adapted for mowing golf course greens.

The process of mowing a green with a triplex mower involves a circumferential cut around the perimeter of the green either preceded or followed by back-and-forth cross cutting in straight parallel lines to complete the mowing operation. Heretofore, the reels have been symmetrically arranged relative to the center line of the mower. Because the edge of the green must always be in the same location, the mower drive and steering wheels follow the same track each time the circumferential cut is performed resulting in the track area becoming unduly compacted. Such compaction can be avoided when performing the cross cutting operation but it requires the operator to take care to vary the starting position and/or angle of the cross cutting on successive cross cutting operations to thereby direct the wheels into different tracks each operation.

SUMMARY OF THE INVENTION

According to the present invention there is provided a novel triplex greens mower.

A broad object of the invention is to provide a self-propelled, triplex greens mower having reel units arranged so that compaction caused by the wheels of the mower can be easily avoided both when mowing the circumference of the green and when cross cutting the green.

A more specific object of the invention is to provide a self-propelled greens mower having its reel units non-symmetrically arranged relative to the center line of the mower so that the reels on opposite sides of the mower are spaced from the mower center line by distances which vary from each other at least the width of the mower wheels, whereby alternating directions of cut around the perimeter of a green will result in the wheels following different tracks.

These and other objects, features and advantages of the present invention will become apparent to those skilled in the art from the description which follows and from the drawings.

DESCRIPTION OF THE PREFERRED EMBODIMENT

Figure 1:
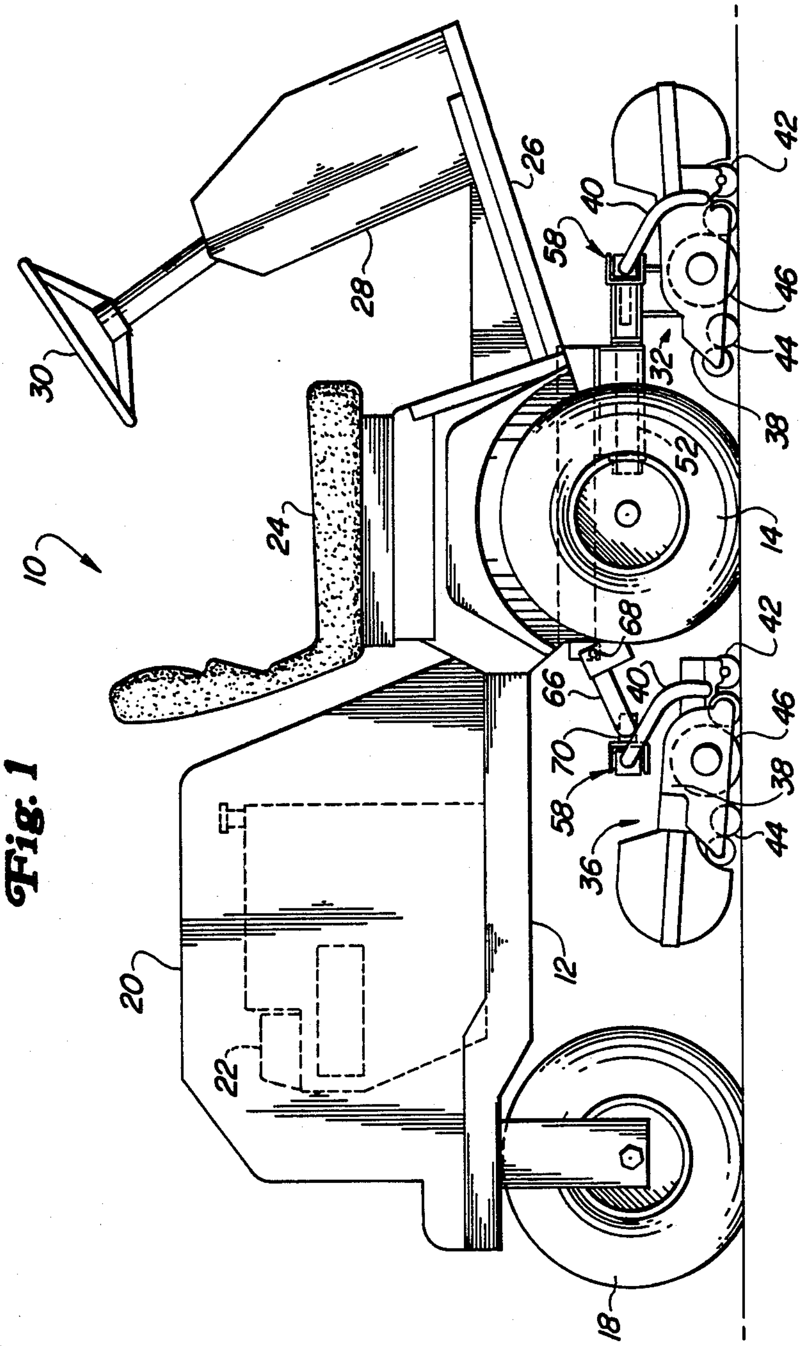
FIG. 1 is a side elevational view of a triplex greens mower constructed in accordance with the principles of the present invention.

Referring now to the drawings, there is shown a self-propelled triplex greens mower 10 including a main frame 12 supported on right and left front drive wheels 14 and 16, respectively, and a steerable rear wheel 18. It is to be noted that dual wheel assemblies could be substituted for one or more of the single wheels 14, 16, 18 without departing from the present invention. The mower 10 includes an engine compartment 20 arranged on the frame 12 ahead of the rear wheel 18 and enclosing an engine 22. Located on the main frame 12 between the front wheels 14 and 16 is an operator's seat 24. A platform 26 is cantilevered forwardly from the frame 12 and supports a pedestal 28 at its forward end. Operator controls, of which only a steering wheel assembly 30 is shown, are mounted to the pedestal 28 so as to be within easy reach of a seated operator.

Identical right and left front and central rear mower units 32, 34 and 36, respectively, are mounted to the main frame 12 so as to cut respective paths ahead of the wheels 14, 16 and 18 in order that grass will be cut to a desired height before being bent down by the wheels. The mower ujnits each include a frame 38 including a mounting bail 40. Each frame 38 carries front and rear rollers 42 and 44, respectively, and a cutting reel 46 located between the rollers. The mower units 32 and 34 are coupled to the main frame 12 by rightwardly and leftwardly projecting support arms 48 and 50, respectively, The arms 48 and 50 have respective inner ends mounted to the frame 12 for vertical pivotal movement about a horizontal, longitudinal axis defined by coupling structure 52 located at a lower, forward location of the frame offset rightwardly from a longitudinal center line a of the mower. The outer ends of the arms 48 and 50 are respectively defined by cylindrical sockets 54 and 56, each having a longitudinal axis paralleling the center line a. The mower units 32 and 34 are respectively coupled to the arms 48 and 50 by identical swivel connectors 58 having stems 60 journalled in the sockets 54 and 56 and clevises 62 coupled, as by pins 64, to midpoints of the bails 40 so as to be equidistant from opposite ends of the reels 46. The mower unit 36 is coupled to the main frame 12 by a U-shaped trailing support arm 66 having forward ends coupled to the main frame for vertical pivotal movement about a horizontal transverse axis established by pivot connections 68 approximately located within a transverse vertical plane extending tangentially to rear peripheral portions of the wheels 14 and 16. The arm 66 carries a socket 70 oriented similarly to the sockets 54 and 56 of the arms 48 and 50 and offset rightwardly from the center line a. Another swivel connector 58 has its stem journalled in the socket 70 and its clevis coupled to a midpoint of the mounting bail 40 of the frame of the rear mower unit 36.

The mower units 32, 34 and 36 are here shown in lowered operative positions and are oriented for straight ahead mowing. Powered lifting means (not shown) such as hydraulic cylinders, or the like, would normally be coupled between the main frame and the mower unit support arms 48, 50 and 66 for selectively lifting the arms so as to elevate the mower units from their operative positions.

Figure 2:
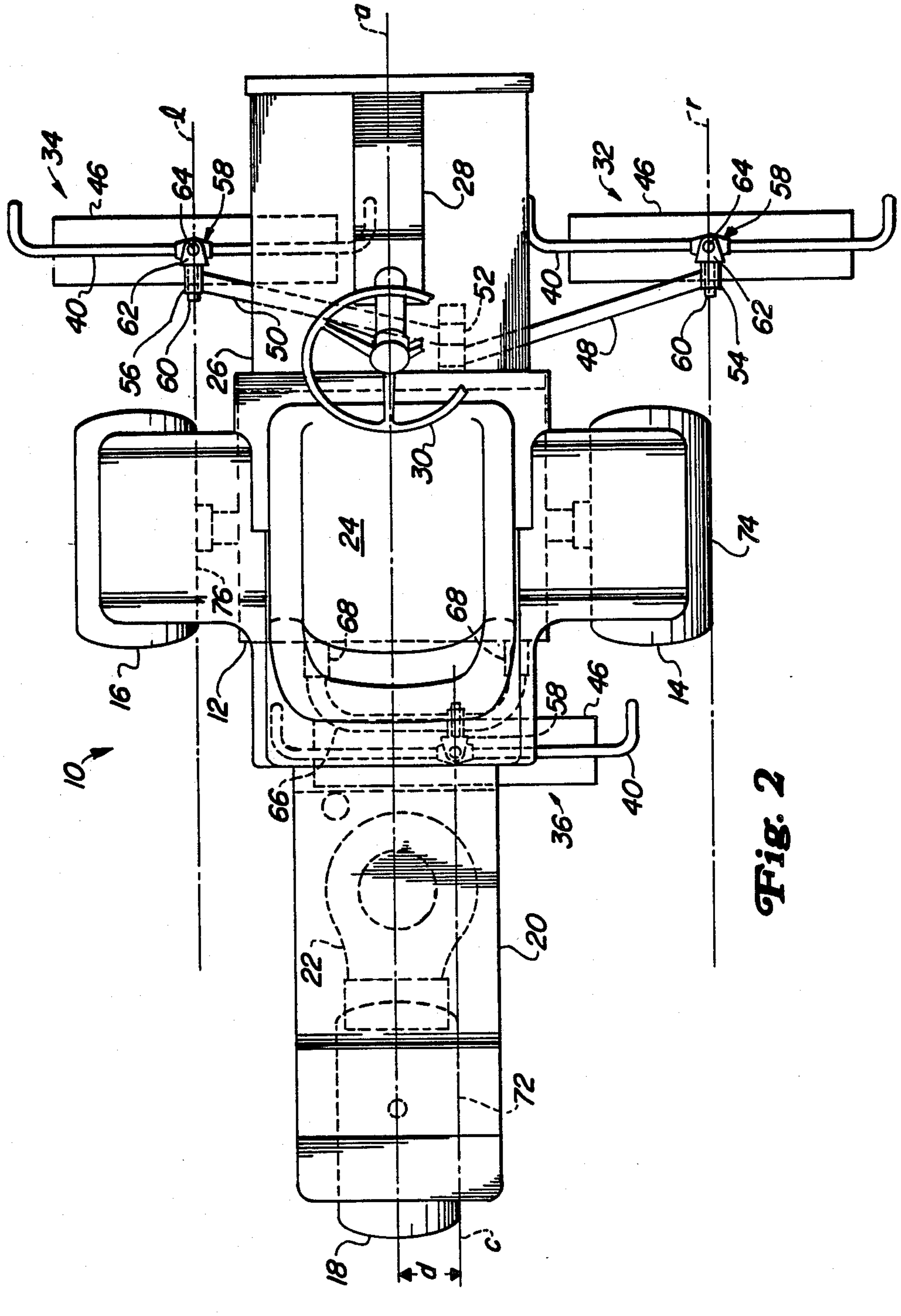
FIG. 2 is a top plan view of the mower shown in FIG. 1 but with details of the reel units omitted.

The present invention will now be described with reference to FIG. 2 where it can be seen that the mower units 32, 34 and 36 are not symmetrically arranged relative to the mower center line a but rather are symmetrically arranged relative to a longitudinal line c offset to the right of the center line a by a distance d and passing centrally through the rear mower unit 36. The offset distance d is here shown as being equal to onehalf of the width of the wheels so that the line c is coincident with a right face 72 of the rear wheel 18 and similar lines r and l respectively passing centrally through the right and left front mower units 32 and 34 are coincident with respective right faces 74 and 76 of the front wheels 14 and 16. The offset distance d should be at least that shown and can be greater so long as the cutting reels are sized to properly overlap and cut grass from the path to be followed by the trailing wheels.

The operation of the mower 10 in mowing a green will now be described. Assuming it is desired to mow a green by starting with a circumferential cut around the perimeter of the green and the green has previously been cut by traveling clockwise around its perimeter, the operator will orient the mower 10 for traveling counterclockwise about the green. The right end of the reel 46 of the right front unit 32 will then be located at the trimmed edge of the green with the wheel 14 following a path adjacent to that followed by the left wheel 16 during the previous cutting of the green. Thus, the wheels follow the same path every other mowing instead of every mowing as is the case with mowers having symmetrically arranged mower units. This greatly reduces the occurrence of depressed, packed tracks as are caused by conventional mowers. Once the circumferential cut of the green is completed, the green is crosscut by driving back and forth across the green in straight parallel paths. Because the mower units are offset, the mower wheels can be caused to follow different tracks each time the cross cutting operation is performed merely by making the first cut by driving in a direction opposite from that driven when performing the first cut the previous time the cross cutting operation was performed. Thus, the starting position and angle of cut can be kept the same and accordingly makes the mowing task simpler for an operator to perform.

We claim:

1. In a self-propelled triplex greens mower including a main frame supported on a pair of front wheels and a rear wheel, with the wheels being arranged symmetrically relative to a longitudinal center line of the mower, three mower units mounted on the frame respectively for operation ahead of the pair of front wheels and the rear wheel and overlapped for mowing a swath of grass at least slightly wider than the distance between respective outer faces of the pair of front wheels, the improvement comprising: said mower units each being transversely offset so as to be non-symmetrically arranged relative to said center line of the mower with the extent of said offset being equal to at least one-half the width of one of said wheels, with the sizes of the wheels and the spacing of the front wheels from said center line being such that reversing the direction of the mower in forwardly mowing a given swath of grass will result in the wheels following different paths.

2. In a self-propelled triplex greens mower including a main frame supported on a pair of front wheels spaced equidistant from, and a rear wheel centered on a longitudinal center line of the mower, a pair of front mower units mounted on the frame for mowing ahead of the pair of front wheels, respectively, and a rear mower unit mounted on the frame for mowing ahead of the rear wheel, and said units as viewed in the direction of the center line being overlapped and having a combined width of cut at least slightly greater than the distance between respective outer faces of the front wheels, the improvement comprising: said mower units each being nonsymmetrically arranged relative to said center line by a transverse distance at least equal to one-half the width of one of the wheels, with the sizes of the wheels and the spacing of the front wheels from said center line being such that the mower may be operated in opposite and forward directions along a given swath of grass without the wheels traversing the same track.

3. In a self-propelled triplex greens mower including a main frame supported on a pair of right and left front wheels and a rear wheel respectively adapted to follow parallel paths during straight-ahead travel of the mower, a pair of front mower units respectively mounted on the frame for mowing ahead of the pair of front wheels and a rear mower unit mounted on the frame for mowing ahead of the rear wheel and said units, as viewed in the direction of said paths being overlapped and having a combined width of cut at least slightly greater than the distance between respective outer faces of the front wheels, the improvement comprising: said pair of front mower units and said rear mower unit being centered respectively along lines parallel to and being offset transversely in a first direction from said parallel paths by a distance no less than one-half the width of one of the wheels, with the sizes of the wheels and the spacing of the front wheels from said center line being such that operation of the mower in opposite and forward directions along a given swath of grass will result in the wheels running in different tracks.

* * * * *